Sept. 15, 1936.  W. O. BALLARD  2,054,553
INTERIOR DECORATION FOR BLOWN PLASTIC WARE
Filed Feb. 14, 1935
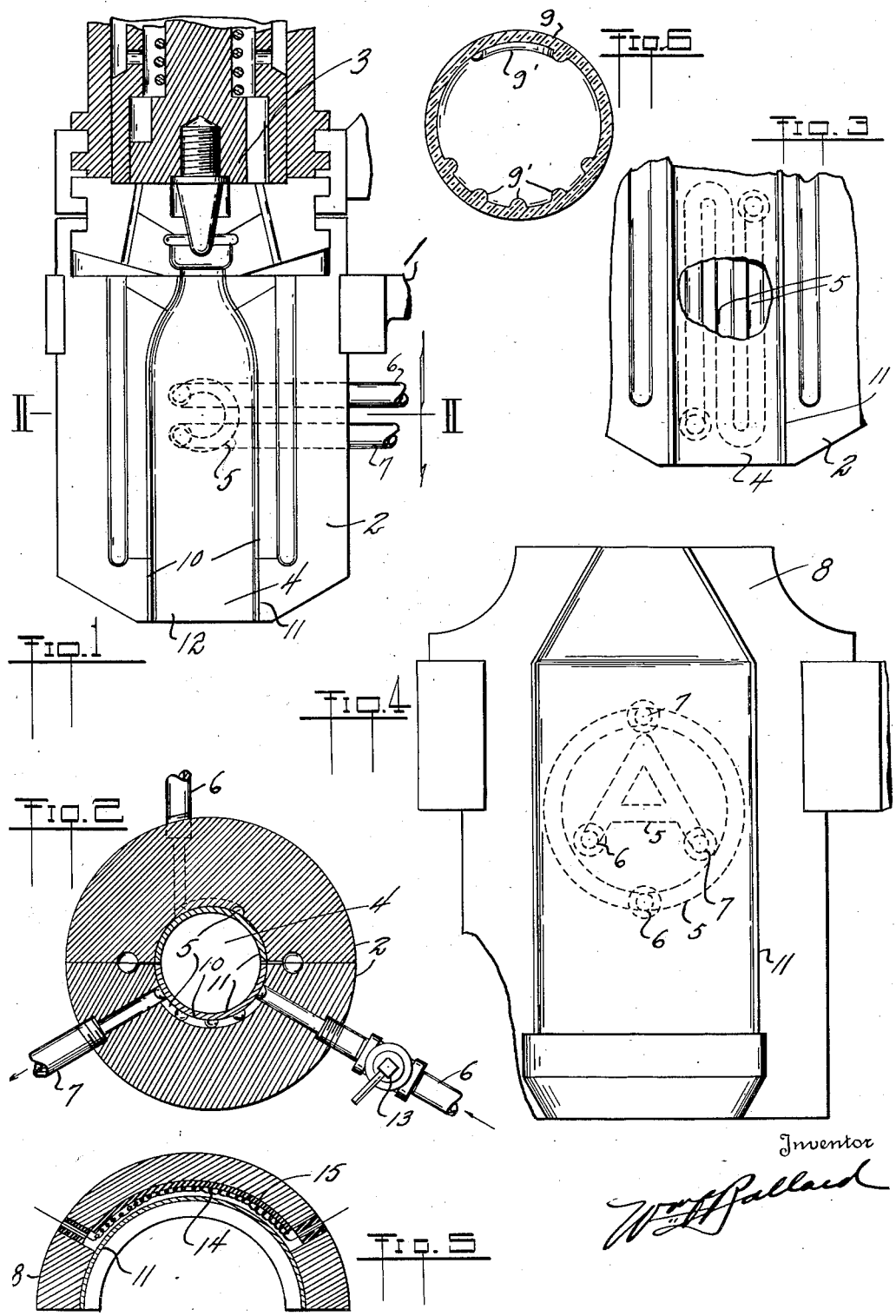

Patented Sept. 15, 1936

2,054,553

UNITED STATES PATENT OFFICE 2,054,553

INTERIOR DECORATION FOR BLOWN PLASTIC WARE

William O. Ballard, Toledo, Ohio

Application February 14, 1935, Serial No. 6,444

11 Claims. (Cl. 49—70)

This invention relates to forming plastics into hollow ware.

This invention has utility when incorporated in hollow ware forming machines, more particularly for the decorating of blown hollow ware on the interior thereof.

Referring to the drawing:

Fig. 1 is a view of a blank mold section for hollow ware forming, the device herein shown being primarily adapted for the gathering of glass blanks to be subsequently blown into hollow ware;

Fig. 2 is a view on the line II—II, Fig. 1;

Fig. 3 is a view similar to Fig. 1; parts being broken away to show the mold construction embodying the invention herein;

Fig. 4 is a view looking into a finish or blow mold for final blow operation of a plastic blank;

Fig. 5 is a section through a fabricating blank mold showing a heating element embedded within the mold body; and Fig. 6 is a section through a hollow ware article showing the decoration extending to the interior thereof.

The invention herein relates more particularly to the placing of designs on the interior of hollow ware such as bottles, wherein it is impractical to insert marking or molding means into the article during the formation thereof. Under the invention herein, the bottle may be marked with insignia, lettering or other decorative design by thickening predetermined portions of the wall so that the design extends into the bottle, leaving the exterior smooth and without projections.

Arm 1 from glassware fabricating machine carries blank mold 2 suspended beneath and in cooperation with mechanism 3 of a nipple box. Plastic mass, such as molten glass, may be charged into chamber 4 to form a blank. The chamber 4 has a predetermined way or duct 5 chilled by flow of a cooling medium from line 6 through the chamber 5 and thence away from the mold by way of line 7. The chamber 5 may be of any desired shape so that a glass gather or blank in the chamber 4 may have a definite portion thereof chilled by the cooling medium, thereby reducing the plasticity of that portion of the blank. The way or duct 5 extends close to the article forming surface of the mold so that the action of the cooling medium is localized to the region desired. The blank may then be transferred on the fabricating machine to a blow or finish mold 8 to receive finish blow expanding of the charge into finished bottle or other hollow ware article 9 with design 9' embossed on the interior.

Each mold half 2 of a complete mold may have the same or different duct extent therethrough for the cooling medium and wherein it is desired to obtain duct extensions not susceptible of direct boring through the mold, the mold parts 2 may have interior faces 10 approximate blank or finished ware form but slightly larger. The design may then be grooved or cut into the surfaces 10 with the inlet and outlet ducts extending from the respective ends of the ways 5 and an insert 11 nested with the face 10; such insert providing ware forming face 12 and converting the grooves on the face 10 into fluid tight ducts. The flow of cooling medium may be regulated by valve 13 in the line 6 so that the proper chilling temperature may be maintained.

While it is desirable to chill the blank in predetermined and definite regions the chilling may also be had in the finish mold 8, wherein the marking is to be less definite. The designs on the interior of the bottle are thus readily formed to the predetermined contrasting temperatures of the mold faces; and wherein it might be desirable to have the design on the interior of the bottle thinner than the bottle body, heating element 14 may be placed in the way 5, the heating element being carried by insulation 15 so that instead of a cooling or chilling action along the line of the desired design, a heating or increased temperature is had. Thus there is increase in the plasticity of the mass so that in the final blow the wall at this increased plasticity region will be forced to a thinness beyond the general thickness of the ware body as a whole.

There is not only obtained a uniqueness in appearance but a utility for the life of the bottle, especially those refilled in the trade. The outside smoothness is not susceptible to chipping or wear suffered by exterior embossed bottles. The unique designs on the interior are protected against breakage or knicking. The continuously smooth outer surface serves to defeat chipping of the embossing, even in hard usage such as in the beverage trade where the bottles are subjected to immersion in cracked ice and repeated handling.

The contrasting temperature regions embodied on the plastic mass during fabrication determines the ultimate interior design, while the mold determines the outer design, thereby allowing a blown plastic article such as a glass bottle to have a definite design on the interior thereof.

What is claimed and it is desired to secure by Letters Patent is:

1. A mold for fabricating glassware comprising a main body and a sheet metal nested insert providing the forming face.

2. A mold for fabricating glassware having a cavity, a way along the face of said cavity, an insert nested in said cavity providing a forming face on one side thereof, and forming a duct with said way on the opposite side thereof and a member connected with said way for conducting a temperature affecting medium thereinto.

3. The method of forming a design on glassware comprising segregating a mass of molten glass, creating a contrasting temperature region on a mold face comparable with the predetermined design, placing said molten mass in said mold while maintaining said contrasting temperature region, and shaping said mass by said mold.

4. The method of producing a design on the inside of a blown, hollow, plastic ware article comprising segregating a mass of material to be formed into the article, and creating controlled contrasting temperatures in the mass during article formation.

5. A mold for fabricating glassware having a region approximating finished ware form, a way along the surface of said region, a glassware forming insert nested with said mold, said insert and way forming a cooling duct for a portion of said insert and a duct in communication with said way for supplying cooling medium thereto.

6. The method of forming a design on the interior of hollow glassware comprising charging a mold with a mass of molten glass, and imposing a temperature change through the mold into the molten glass coextensive with the design prior to freezing the mass into finished form.

7. The method of forming a design on the interior of a piece of hollow glassware comprising forming a mass of molten glass by a mold into a blank, chilling a design region through the mold on said blank, and blowing the blank to finished form.

8. The method of producing a design on the inside of a blown, hollow, plastic ware article comprising segregating a mass of material to be formed into the article, shaping said mass by a mold, and simultaneously through the mold influencing the temperature in a portion of the mass, said portion confined to the design extent.

9. A mold for fabricating glassware having a forming wall and means for affecting the temperature of a definite portion of said wall comprising a duct through the mold adjacent the forming wall imposing a temperature change coextensively distinct along said wall.

10. A mold for fabricating glassware having a forming wall and means for affecting the temperature of a definite portion of said wall comprising a duct through the mold adjacent the forming wall, said duct having a flat wall toward the forming wall.

11. A mold for fabricating glassware having a forming wall and means for affecting the temperature of a definite portion of said wall comprising a duct through the mold adjacent the forming wall, said duct having a flat wall toward the forming wall disposed to impose a temperature change coextensively distinct along said wall, and means for controlling the temperature in said duct.

WM. O. BALLARD.